United States Patent
Canepa

Patent Number: 5,881,488
Date of Patent: Mar. 16, 1999

[54] FISH BITE DETECTOR

[76] Inventor: Michael J. Canepa, 234 Rockwood Dr., Grass Valley, Calif. 95945

[21] Appl. No.: 898,066

[22] Filed: Jul. 22, 1997

Related U.S. Application Data

[60] Provisional application No. 60/025,338, Sep. 3, 1996.

[51] Int. Cl.$^6$ .......................... A01K 69/00; A01K 97/12
[52] U.S. Cl. .............................................. 43/4.5; 43/44.95
[58] Field of Search .................................. 43/4.5, 17, 24, 43/43.12, 44.87, 44.88, 44.95; 24/908, 327, 507

[56] References Cited

U.S. PATENT DOCUMENTS

| | | |
|---|---|---|
| 3,131,449 | 5/1964 | Iida . |
| 3,550,302 | 12/1970 | Creviston . |
| 3,878,635 | 4/1975 | Trosper ........................................ 43/17 |
| 4,021,957 | 5/1977 | Gleason . |
| 4,399,630 | 8/1983 | Lawes . |
| 4,437,255 | 3/1984 | Reed ........................................... 43/17 |
| 4,458,437 | 7/1984 | Ou . |
| 4,541,195 | 9/1985 | Delaney . |
| 4,541,196 | 9/1985 | Jershin . |
| 4,660,316 | 4/1987 | Gamelin ...................................... 43/17 |
| 4,766,688 | 8/1988 | Hiles . |
| 4,872,280 | 10/1989 | Smith . |
| 4,905,398 | 3/1990 | Botbyl . |
| 4,930,243 | 6/1990 | Lowe et al. . |
| 5,125,181 | 6/1992 | Brinton . |
| 5,495,688 | 3/1996 | Sondej et al. . |

FOREIGN PATENT DOCUMENTS

| | | | |
|---|---|---|---|
| 2596616 | 10/1987 | France ....................................... 43/17 |
| 1251187 | 10/1971 | United Kingdom ...................... 43/17 |

*Primary Examiner*—Jack W. Lavinder
*Attorney, Agent, or Firm*—George W. Finch

[57] ABSTRACT

A fish bite detector assembly for attachment to a fishing pole. The assembly includes a battery powered electrical system to signal a fish bite activated by a magnetically controlled switch. The switch is normally open when in close proximity to a magnet. A compression clip operably connected to the magnet, grasps the fishing line forming an integral link between the magnet and the fish hook. A bite or disturbance of the hook causes the magnet to move away from the switch, thus, closing the switch contacts, energizing the electrical system, and activating an audible alarm.

15 Claims, 3 Drawing Sheets

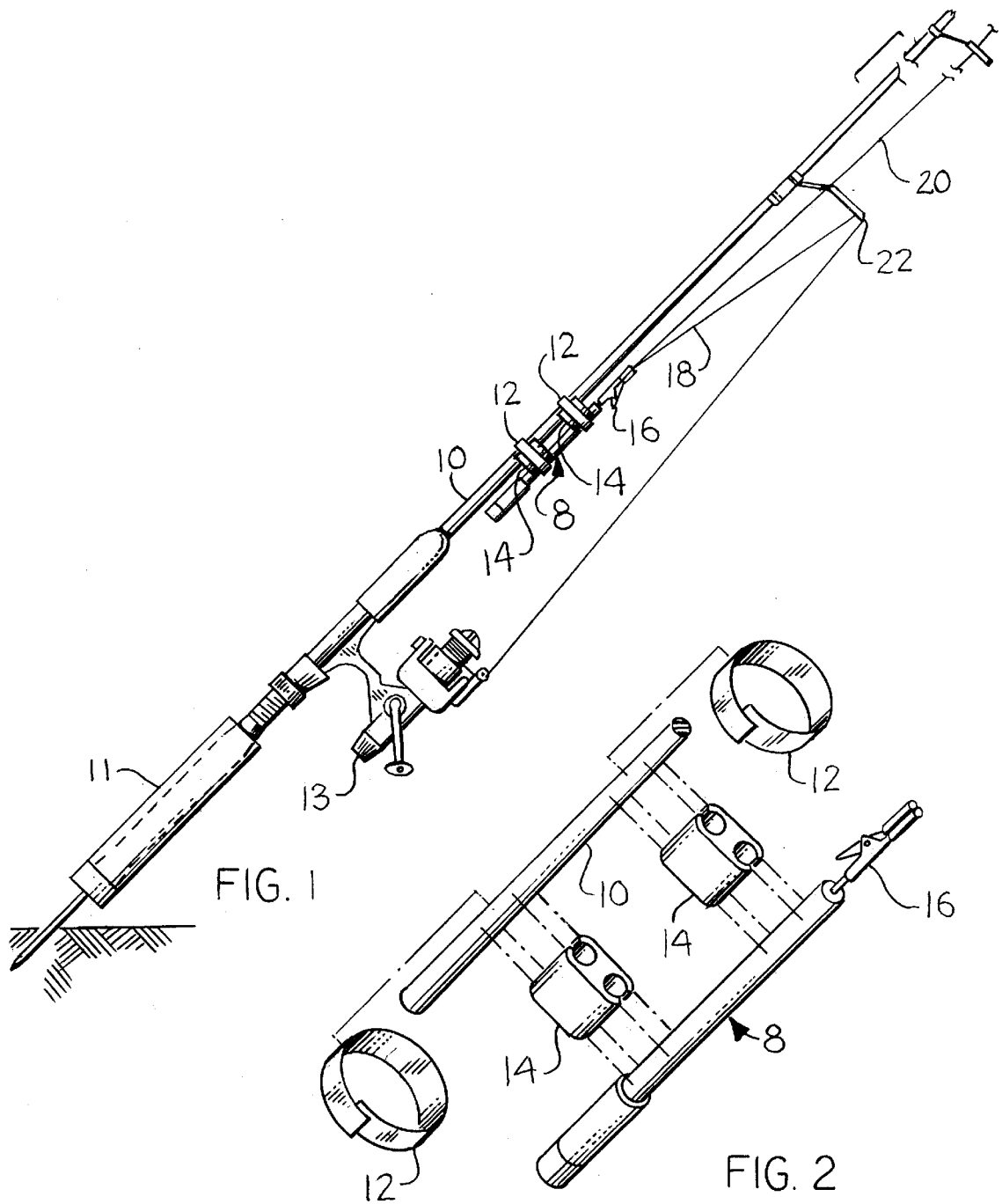

FISH BITE DETECTOR

This Application claims benefit of Provisional Appln. 60/025,338 filed Sep. 3, 1996.

BRIEF DESCRIPTION OF THE INVENTION

The present invention relates to a fish bite detector assembly for attachment to a fishing pole. The assembly includes a battery powered electrical system to signal a fish bite. The system, cased in cylindrical tubing, incorporates a magnetically controlled switch, magnetic control piston, and audible alarm. The switch is normally open when in contact or close proximity to the control piston. A compression clip connected to the piston, grasps the fishing line forming an integral link between the piston and the baited fish hook. A bite or disturbance of the bait will cause the piston to move away from the switch, thus, closing the switch contacts, energizing the electrical system, and activating the audible alarm.

When handling the fishing pole after a bite, the need to physically disconnect the fishing line from the compression clip is unnecessary. A violent jerk of the fishing pole to set the hook in the fish will result in separation of the fishing line from the jaws of the compression clip allowing the control piston will return to contact or close proximity to the switch, de-energizing the electrical system and alarm.

Therefore, it is an object of the present invention to provide an improved fish bite detector that is simple and economical to construct.

Another object is to provide a reliable fish bite detector that can withstand the rigorous environment of salt water fishing.

Another object is to provide a fish bite detector that is small and light weight.

Another object is to provide a fish bite detector that can be attached as an after marketed accessory to almost any fishing pole without requiring any permanent modification to the pole.

These and other objects and advantages of the present invention will become apparent to those skilled in the art after considering the following detailed specification, together with the accompanying drawings wherein:

BRIEF DESCRIPTION OF THE DRAWINGS

FIG. 1 is a perspective view of a fishing pole with the fish bite detector secured to the pole between the reel and the first eye of the pole, the fishing line being doubled back from the first eye and attached to the detector of this invention in a set position;

FIG. 2 is an exploded perspective view of the components required to secure the present bite detector to a fishing pole;.

DETAILED DESCRIPTION OF INVENTION

Figure 3:
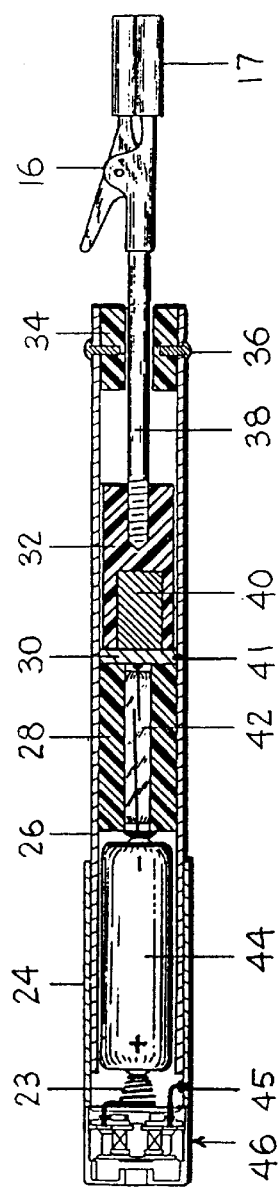
FIG. 3 is a cross-sectional view of the bite detector in a first position with the alarm armed.

Referring to the drawings more particularly by reference number, number 10 of FIG. 1 refers to a fishing pole placed in a pole support 12 with fish bite detector 14 attached parallel to pole 10 between the fishing reel 16 and the first eye 18 of pole 10. A length of fishing line 20 is doubled back from eye 18 and clasped in compression clip 22 of detector 14 to establish a "Set" or ready position. Fishing line 24, which is a continuation of line 20, extends from the clip 22 to the tip (not shown) of pole 10 and into the water, and has a baited fish hook or lure attached thereto.

FIG. 2 is an exploded perspective view of two extruded high adhesion rubber connectors 26 used to interconnect the detector 14 to the pole 10. The connectors 26 are cut to length from extruded rubber manufactured by several rubber companies. When interconnected, detector 14, connectors 26, and pole 10 are encompassed and secured by two multi-purpose traps 27, such as are sold under the trademark GET-A-GRIP by VELCRO USA INC.

FIG. 3 illustrates in partial cross-section, the components and structural arrangement of detector 14. The components include cylindrical brass housing 28 which accommodates a 12 volt DC battery 30 similar to EVEREADY A-23, a nylon switch housing 32 encompassing one magnetically controlled reed switch 34, a ferrous high silicon metal slug 36, a nylon control piston 38 encompassing permanent magnet 40, a control piston shaft 42 threaded into piston 38, a nylon shaft guide 44, two shaft guide pin rivets 46, and the mini-alligator compression clip 22 soldered or otherwise connected to the piston shaft 42. A neoprene tube 48 covers each serrated jaw 50 of clip 22 to prevent cutting of the fishing line 20, yet assuring adhesion thereto.

A cylindrical brass battery cap 52 is positioned at the rear 54 of the housing 28, with a frictional interference fit allowing it to telescope outside the housing 28. The cap 52 includes a miniature self contained drive circuit audio transducer 56 available from most quality electronic distributors, and a battery compression spring 58, which is available from most spring distributors.

Referring to FIG. 3, detector 14 is shown in a "Set" or armed position with a simple series electrical circuit de-energized. Components which constitute the electrical circuit are the negative pole 60 of the battery 30 contiguous with the solder connection 61 on the non-contact end 62 of reed switch 34, contact end 64 of reed switch 34 to slug 36 by means of solder connection 66, solder connection 68 from slug 36 to housing 28, housing 28 telescoping contact with battery cap 52, battery cap 52 to negative post 70 of transducer 56, solder connection 72 to battery cap 52, positive post 74 of transducer 56, solder connection 76 to compression spring 58, and compression spring 58 contiguous with positive pole 78 of battery 30. The piston 38 containing magnet 40 is held against the ferrous slug 36 by magnetic attraction with a break-away resistance of approximately two ounces. The magnetic field emitted from magnet 40 extends beyond slug 36 encompassing the contacts 80 and 82 in the reed switch 34 holding contact 82 away from contact 80 to maintain an open condition.

Figure 4:
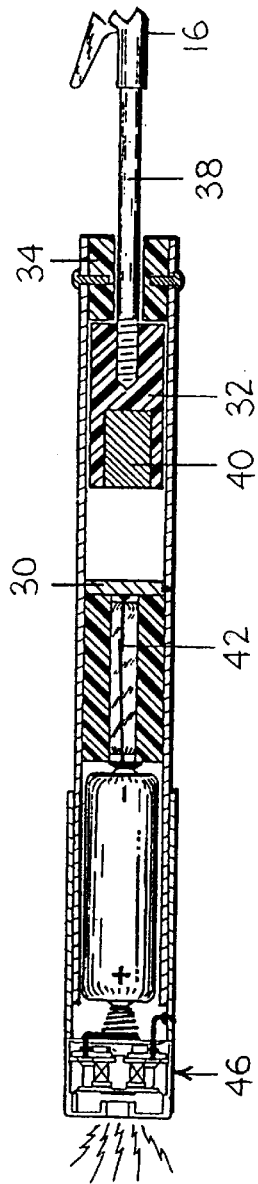
FIG. 4 is a cross-sectional view of the bite detector in a second position when a fish bite has activated the electrical system audible alarm of the present invention.

FIG. 4 illustrates detector 14 with the electrical circuit energized. A fish bite of sufficient magnitude will result in movement of fishing line 20 connected to clip 22, shaft 42, and piston 38 containing the magnet 40. When the intensity of the pull force overcomes the magnetic resistance between magnet 40 and slug 36, the piston 38 containing the magnet 40 will move away from slug 36 to a position against the shaft guide 44. When the distance between magnet 40 and slug 36 reaches approximately 6 millimeters, the density of magnetic field at the reed switch 34 will be reduced to a value that will no longer hold the reed switch contacts 80 and 82 apart. When the contacts 80 and 82 of the reed switch 34 close, the series circuit activating transducer 56 is completed. The sound output of transducer 56 is at least 85 dB at 10 cm with a frequency of 2,300 Hz plus or minus 300 Hz. Under conditions where there is no excessive transient noise, a person with normal hearing can hear the sound emitted from transducer 56 at a distance of approximately 150 feet.

Figure 5:
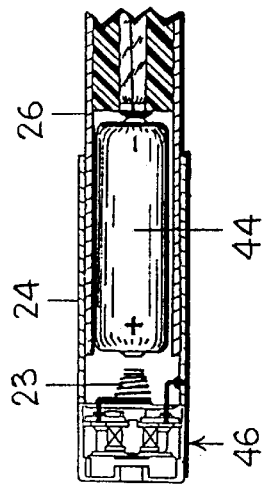
FIG. 5 is a cross-sectional view of the bite detector electrical system in its disarmed or OFF position.

FIG. 5 illustrates a partial cross-sectional view of detector 14 with the electrical system OFF. Detector 14 is unlike most electrical systems, which incorporate ON/OFF mechanical switches comprised of four or more components. A fisherman may turn off the electrical system in detector 14 with a simple pull of battery cap 52. When battery cap 52 has telescoped on housing 28 approximately one-eighth of an inch, spring 58 will disengage from the positive pole 78 of the battery 30 assuring an open electrical circuit even if the contacts 80 and 82 in reed switch 34 are closed. Battery cap 52 may be completely removed from housing 28 when necessary to remove or replace the battery 30.

Figure 6:
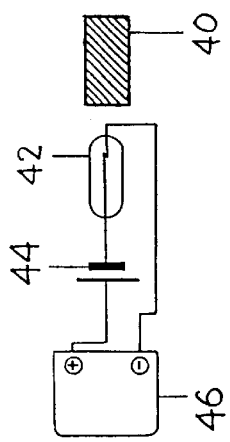
FIG. 6 is an electrical schematic of the simple series circuit of the present invention.

FIG. 6 illustrates an electrical schematic of the simple circuit contained within detector 14. While magnet 40 is not integrated within the electrical circuit, it is a key component necessary to operate reed switch 34. The series circuit interconnects a 12 volt battery 30, the reed switch 34 with normally closed contacts which open when within the magnetic field of magnet 40, and the self contained drive circuit transducer 56. Battery 30, reed switch 34 and magnet 40 are enclosed in the electrically conductive housing 28. The transducer 56 is integrated with the electrically conductive battery cap 52, which telescopes over housing 28 approximately 1 inch to establish electrical contact there between. The overall length of detector 14 is in the order of 5.5 inches and is approximately 15/32 (0.47) inches in diameter.

Figure 7:
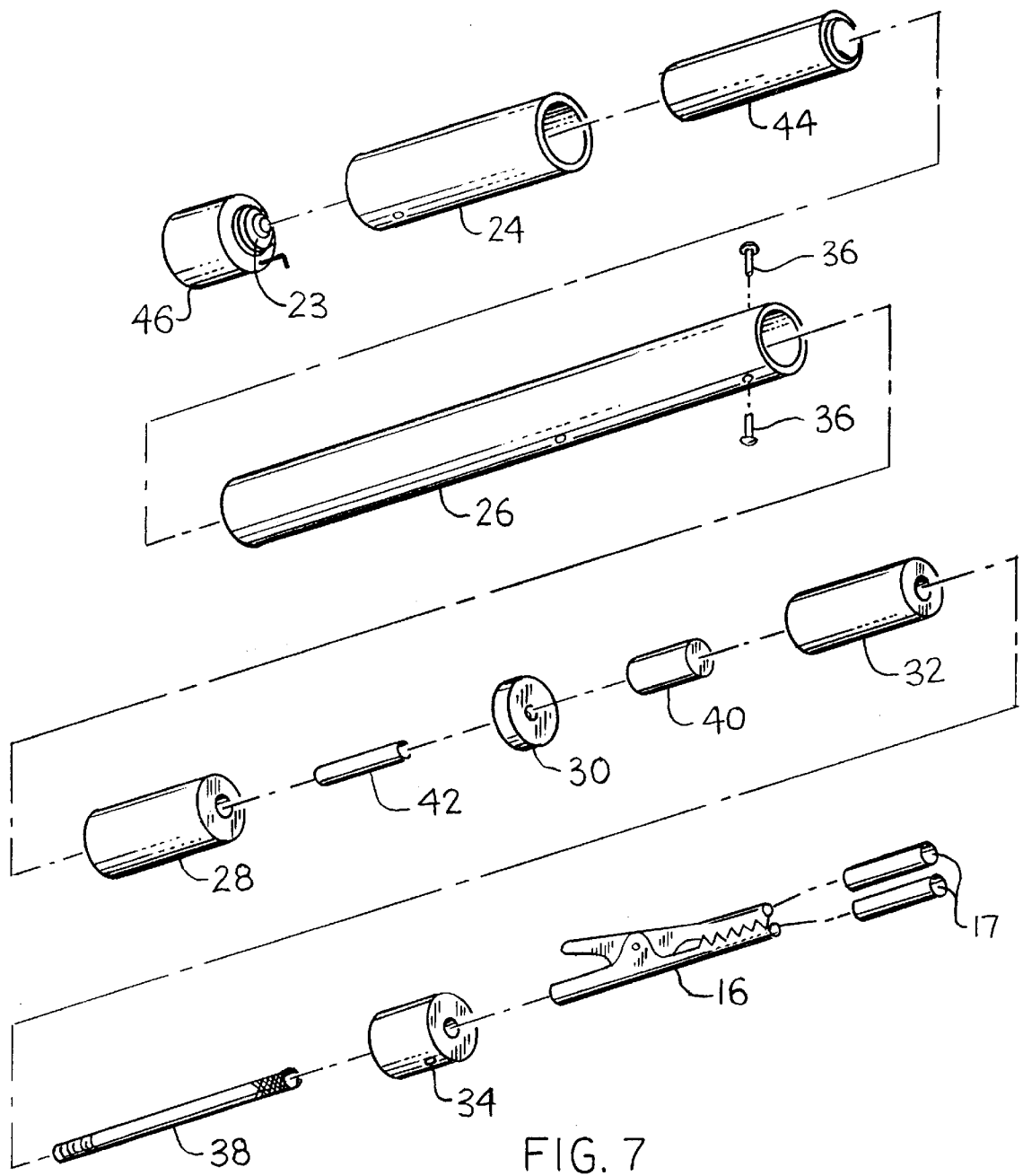
FIG. 7 is an exploded perspective view of the bite detector of the present invention.

FIG. 7 illustrates an exploded view of all components necessary for the assembly of detector 14. Assembly can be accomplished by performing the following basic procedure. Spring 58 is soldered to the positive post 74 of transducer 56. The negative post 70 of the transducer 56 is soldered to the cap 52. The outer housing 84 of the transducer 56 is epoxy cemented to cap 52. Transducer 56 and cap 52, now integrated, telescope over the rear 54 of housing 28 approximately 1 inch. Solder bead 66 solders slug 36 to the contact end 64 of the switch 34. The switch 34 is telescoped inside switch housing 32 until slug 36 butts firmly against end of the switch housing 32. Both switch 34 and slug 36 are epoxy cemented to housing 32. A large bead of solder 61 is placed on the non-contact end 62 of switch 34 adjacent the end surface 88 of housing 32, which forms the contact for the negative pole 60 of battery 30. This complete assembly housing 32, switch 34, and slug 36 are telescoped into housing 28 where the outer circumference of slug 36 is soldered to housing 28 through a pre-drilled hole 90. Magnet 40 telescopes inside piston 38 and is epoxy cemented thereto. Shaft 42 is threaded into piston 38. Guide 44 is telescoped over the shaft 42. Mini alligator clip 22 is soldered or epoxy cemented to the opposite knurled end 92 of shaft 42. This complete assembly, piston 38 encompassing magnet 40, shaft 42, guide 44, and clip 22 are telescoped inside the front end 94 of housing 28. The outer surface 96 of guide 44 is aligned with front end 94 of housing 28 and retained by the two pin rivets 46 positioned through drilled holes 98 into guide 44. Jaws 50 of clip 22 are opened and the neoprene tubes 48 are placed over each.

Referring now to FIGS. 1 through 7, it is important to notice the non-ferrous brass construction of housing 28 and battery cap 52. It is mandatory that these two components be constructed of a non-ferrous, but electrically conductive material to assure there is no external attraction or interruption of the magnetic field emitted by the magnet 40.

If the detector 14 is attached to a metal fishing pole 10, the distance between the pole 10 and detector 14 is controlled by the two rubber connectors 26. The spacing afforded by the connectors 26 needs to be sufficient to prevent interruption of the magnetic field that would negatively affect the operation of detector 14.

Thus, there has been shown and described a novel fish bite detector accessory for a fishing pole, which fulfills all of the objects and advantages sought therefor. Many changes, alterations, modifications and other uses and applications of the subject invention will become apparent to those skilled in the art after considering the specification together with the accompanying drawings. All such changes, alterations and modifications which do not depart from the spirit and scope of the invention are deemed to be covered by the invention which is limited only by the claims that follow.

I claim:

1. A method for detecting the force of a biting fish on a fishing line extending from a reel on a fishing pole out through eyes of the pole including:

connecting a linear force detector to the fishing pole;

connecting the fishing line to the linear force detector by threading the fishing line from the reel to a first eye beyond the linear force detector, back to the force detector and then through a second eye beyond the first eye for application of fish biting force thereto;

establishing a magnetic connection within the linear force detector to establish the linear force required for disconnection of the magnetic connection; and actuating an annunciator with the magnetic force of the magnetic connection when there is disconnection of the magnetic connection.

2. The method as defined in claim 1 wherein the actuating of the annunciator includes:

actuating an audio annunciator.

3. The method as defined in claim 1 wherein said establishing a magnetic connection within the linear force detector includes:

establishing contact between a magnet and a slug of high silicon ferrous material.

4. The method as defined in claim 1 wherein said connecting the linear force detector to the fishing pole includes:

spacing the linear force detector from the fishing pole so if the pole tends to become magnetized, it will not adversely affect the operation of the linear force detector.

5. A fish bite detector for a fishing pole including:

a non-magnetic housing;

a normally closed magnetic reed switch positioned in said non-magnetic housing;

a magnet mounted to move linearly within said non-magnetic housing;

a force releasable fish line connector mounted to said magnet for linear motion with respect to said non-magnetic housing that releases fishing line retained thereby upon the application of more force than is required to move said magnet, said magnet being connected to move linearly with said force releasable fish line connector, said magnet producing a magnetic field and having:

a first position to maintain said normally closed magnetic reed switch open; and a second position to to allow said normally closed magnetic reed switch to close;

a fish bite indicator; and a source of electrical power connected between said reed switch and said fish bite indicator, whereby movement of said magnet in response to movement of said force releasable fish line connector in response to tugging of a fish on fish line releasably connected to said force releasable fish line connector causes said magnetic reed switch to close to energize said fish bite indicator.

6. The fish bite detector as defined in claim 5 further including:

a piston mounted for linear sliding within said non-magnetic housing, said piston having:
 a first end for retaining said magnet; and
 a second end for operable connection to said force releasable fish line connector.

7. The fish bite detector as defined in claim 6 wherein said piston includes:

a shaft having:
 a first end engaged with said piston; and
 a second end connected to said force releasable fish line connector, said detector further including:
  a stop positioned in said housing through which said shaft slidably moves, said stop engages said piston to establish said second position of said magnet.

8. The fish bite detector as defined in claim 7 wherein said non-magnetic housing is cylindrical, said normally closed magnetic reed switch, said magnet, said shaft, and said piston being centrally located therein.

9. The fish bite detector as defined in claim 6 further including:

a slug located between said normally closed magnetic reed switch and said piston positioned to magnetically engage said magnet to establish a disengagement force and to direct the magnetic field of said magnet to maintain said reed switch open when said magnet is magnetically engaged with said slug.

10. The fish bite detector as defined in claim 5 wherein said force releasable fish line connector includes:

an alligator clip having:
 first and second opposed jaws; and
 friction producing tubing about each of said jaws for frictional engagement with fishing line.

11. The fish bite detector as defined in claim 5 wherein said non-magnetic housing includes:

a first end out of which said force releasable fish line connector extends; and
a second open end, said detector further including:
 an end cap having:
  a first open end engaging said second open end of said non-magnetic housing; and
  a second end, said fish bite indicator being positioned in said second end of said end cap.

12. The fish bite detector as defined in claim 11 wherein said source of electrical power is at least one battery positioned in said first open end of said end cap and said second open end of said non-magnetic housing, said at least one battery being electrically connected between said fish bite indicator and said normally closed magnetic reed switch.

13. The fish bite detector as defined in claim 5 further including:

a piston mounted for sliding within said non-magnetic housing, said piston having:
 a first end for retaining said magnet; and
 a second end for operable connection to said force releasable fish line connector; and a slug positioned between said magnetic reed switch and said piston positioned to magnetically engage said magnet to establish a disengagement force and to direct the magnetic field of said magnet to maintain said reed switch open when said magnet is magnetically engaged with said slug, wherein said non-magnetic housing includes:
 a first end out of which said force releasable fish line connector extends; and
 a second open end, said detector further including:
an end cap having:
 a first open end engaging said second open end of said non-magnetic housing; and
 a second end, said fish bite indicator being positioned in said second end of said end cap, wherein said source of electrical power is at least one battery positioned in said first open end of said end cap and said second open end of said non-magnetic housing, said at least one battery being electrically connected between said fish bite indicator and said normally closed magnetic reed switch, when said normally closed magnetic reed switch is closed to actuate said fish bite indicator, the electrical circuit formed starts at said at least one battery to said normally closed magnetic reed switch to said slug to said housing to said end cap to said fish bite indicator and back to said battery.

14. The fish bite detector as defined in claim 5 further including:

at least one non-magnetic spacer for engagement with said housing and a fishing pole; and at least one releasable strap to secure said housing and the fishing pole to said at least one non-magnetic spacer.

15. A fish bite detector for a fishing pole including:

a housing;

a normally closed magnetic reed switch positioned in said housing;

a releasable fish line connector mounted for linear motion with respect to said housing;

a magnet connected to move linearly with said fish line connector, said magnet producing a magnetic field and having:
 a magnetically maintained first position which allows said reed switch to be electrically open; and
 a second position which maintains said reed switch electrically closed;

a fish bite indicator; and a source of electrical power connected between said reed switch and said fish bite indicator, whereby movement of said magnet to said second position in response to movement of said fish line connector in response to tugging of a fish on fish line connected to said fish line connector causes said reed switch to be closed by said magnet to energize said fish bite indicator, said fish bite detector further including:

a piston mounted for sliding linearly within said housing, said piston having:
 a first end for retaining said magnet;
 a second end for operable connection to said releasable fish line connector;

a shaft having:
    a first end engaged with said second end of said piston; and
    a second end connected to said fish line connector, said detector further including:
a stop positioned in said housing through which said shaft slidably moves, said stop abutting said piston to establish said second position of said magnet; and a metal slug located between said reed switch and said piston positioned to magnetically engage said magnet to establish a disengagement force and to direct the magnetic field of said magnet to maintain said normally closed reed switch open when said magnet is magnetically engaged with said slug.

\* \* \* \* \*